Nov. 22, 1938.                    R. M. GREENLEAF ET AL                    2,137,485
                                WHEEL ALIGNMENT APPARATUS
                                  Filed July 26, 1937                2 Sheets-Sheet 1
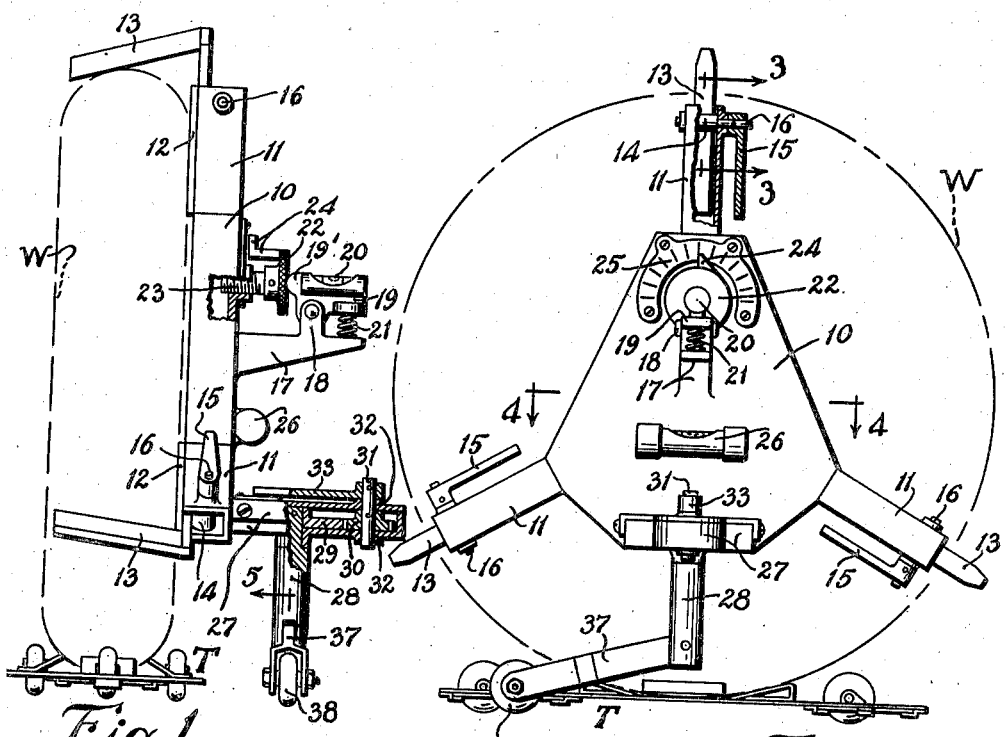
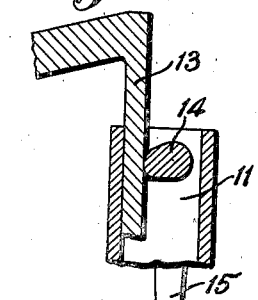
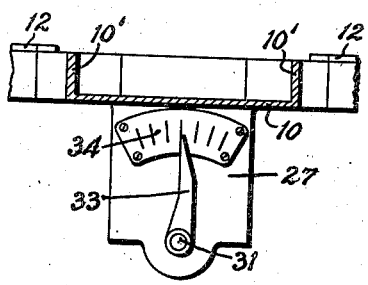
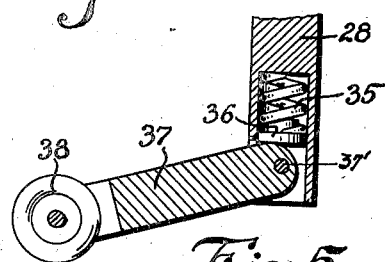
Robert M. Greenleaf & Paul C. Palmer
INVENTORS
BY
ATTORNEY.

Nov. 22, 1938.　　R. M. GREENLEAF ET AL　　2,137,485
WHEEL ALIGNMENT APPARATUS
Filed July 26, 1937　　2 Sheets-Sheet 2
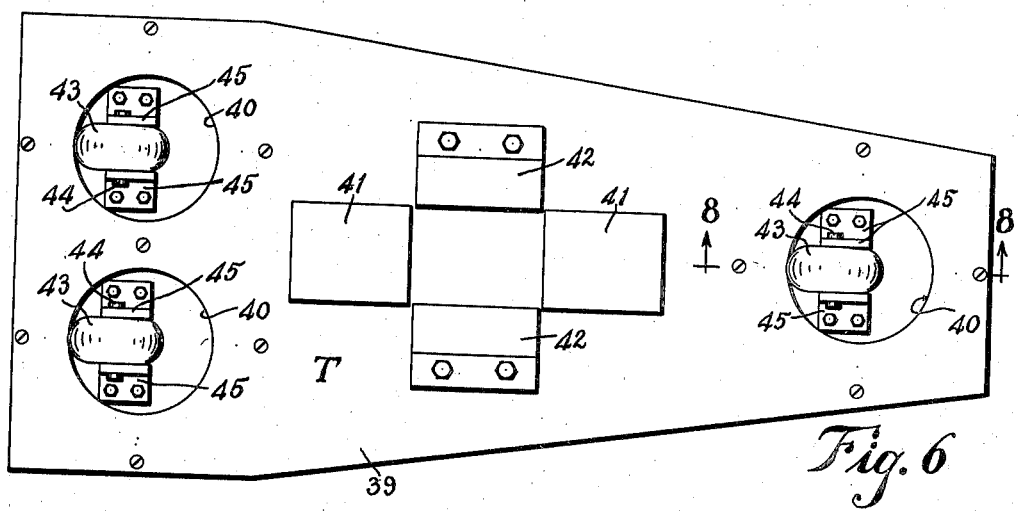
Fig. 6
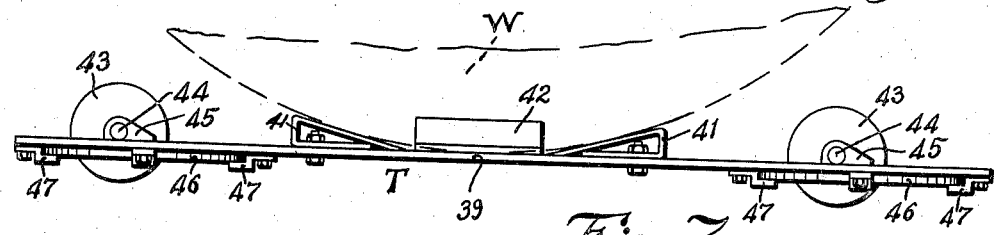
Fig. 7
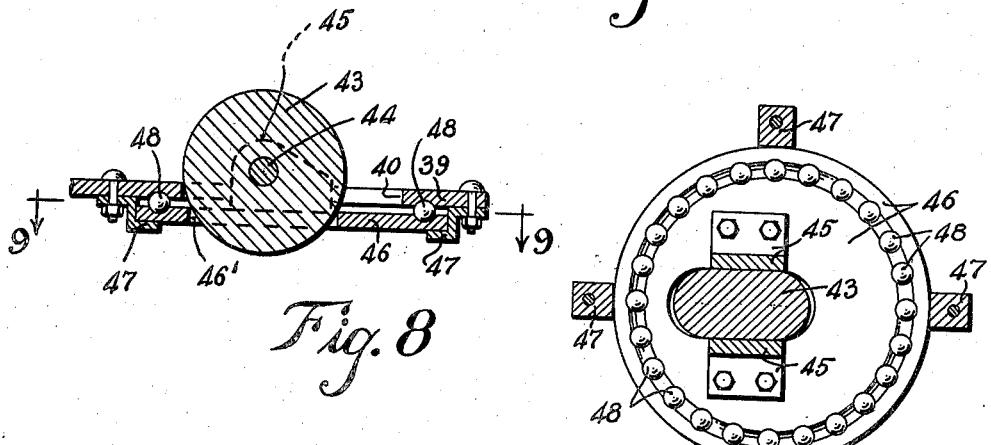
Fig. 8
Fig. 9
INVENTORS,
Robert M. Greenleaf & Paul C. Palmer
BY
ATTORNEY.

Patented Nov. 22, 1938

2,137,485

UNITED STATES PATENT OFFICE 2,137,485

WHEEL ALIGNMENT APPARATUS

Robert M. Greenleaf and Paul C. Palmer, Los Angeles, Calif., assignors to said Robert M. Greenleaf Application July 26, 1937, Serial No. 155,708

13 Claims. (Cl. 33—203)

Our invention relates particularly to an apparatus which can be used to determine the position of a wheel relative to the chassis on which it is mounted, that is, the camber, the caster, the turning radius and the toe-in positions thereof, and it has among its salient objects:

To provide a simple, practical and economical apparatus which can be attached directly to the side of a wheel while it is in place on its axle, said apparatus having connected therewith, and constituting a part thereof, indicating means for determining any changes from the normal or standard position of the wheel, that is: the normal caster, camber, turning radius or toe-in positions thereof.

To provide an apparatus which, when secured on the side of a wheel, will indicate in degrees the amount of incline outwardly at the top of said wheel, which is the camber thereof, and to provide a device of the character referred to which can be applied to the wheels of all kinds of cars.

To provide an apparatus which, when secured on the side of a wheel, also has means for indicating the caster of the axle when wheel is turned to the right or to the left of the straight ahead position.

To provide an apparatus of the character referred to with a caster wheel, as a part thereof, and mounted to move upon the floor or other surface along with said wheel and parallel therewith, said caster wheel being connected with graduated means, operated thereby, for indicating the toe-in of said wheel on either straight ahead or curved course, and irrespective of wheel position measurements.

To provide an improved floor truck suitable for receiving and supporting the wheel being checked and by means of which said wheel is carried forward a distance to permit the caster wheel to assume a straight ahead position in its contact with the floor, said floor truck having an underslung caster arrangement for supporting a wheel close to the floor.

Other objects and advantages to be found in our invention will be referred to in connection with the following detailed description of one practical embodiment thereof, taken with the accompanying two sheets of drawings which will now be described.

Figure 1 is an edge or front view of our device as applied to a wheel, with parts in section;

Figure 2 is a side view thereof;

Figure 3 is a detail in section, taken on line 3—3 of Fig. 2;

Figure 4 is a sectional view taken on line 4—4 of Fig. 2;

Figure 5 is a detail sectional view taken on line 5—5 of Fig. 1;

Figure 6 is a plan view of our new floor truck for holding a wheel;

Figure 7 is a side view thereof;

Figure 8 is a vertical sectional view taken on line 8—8 of Fig. 6; and

Figure 9 is a horizontal sectional view taken on line 9—9 of Fig. 8.

Referring now in detail to the drawings, we will describe the embodiment of our invention here shown for illustrative purposes. A body 10, of somewhat triangular form, though not confined to this form, has inturned flange-like portions 10' and at three outer corners thereof, said body is provided with three channel-like extensions, as 11, 11, with cover plates, as 12, 12 thereover, thus forming slideways therein to receive holding members 13, 13, adapted to overlie a wheel W, designated in light broken lines, and thus support said body against the side of said wheel, as indicated. These holding members are held in place by means of eccentric cam elements, 14, 14, operated by means of hand levers 15, 15, on short shafts 16, 16, through said channel extensions 11, 11, as indicated. Thus said body can be placed against the side of a wheel and held in position by means of said holding members 13, 13, locked in holding positions.

A bracket 17 is formed on or secured to the face of said body 10, with ears 18, 18, and between which is pivotally held a support 19, for a spirit level 20, having an underlying coiled spring 21 at its outer end, as seen in Figs. 1 and 2.

The support 19, for said spirit level 20, has its inner upper end provided with a bearing portion 19', adapted to be engaged by the outer face of a knurled nut 22, on the outer end of a screw 23, threaded through the body 19, as seen in Fig. 1. Said nut 22 has connected therewith a pointer finger 24, which can be moved over a graduated ring member 25, mounted on said body 10, as clearly shown in Fig. 2. Said nut 22 can be turned outwardly or inwardly to adjust the spirit level 20, by moving its support 19.

A second spirit level 26, is mounted on the outer face of said body 10, transversely thereof and of the vertical medial line of said body, whereby to facilitate the adjustment of said apparatus on the wheel in a true vertical position.

At the lower side of the body 10 is secured an outwardly extending supporting member or casting 27, in which is rotatably mounted a downwardly depending shaft 28, having secured to its upper end, within said member 27 a gear 29, which meshes with a pinion 30, on a short shaft 31, extended through said member 27, in suitable bearings, as 32, said shaft being provided on its upper end, above said member 27, with a finger or pointer 33, the end of which moves over a graduated segment 34, as seen in Fig. 4.

The lower end of the shaft 28 is bored to receive a coiled spring 35, as indicated, bearing at its lower end upon a disc 36, which in turn rests upon the end of a pivotally connected arm 37, having a traction wheel 38 at its free end, as seen in Figs. 1, 2 and 5. The spring 35, bearing downwardly on the end of the arm 37, forwardly of its pivot 37', operates to hold said arm 37, and wheel 38, yieldingly down on the floor, with a traction which will cause it to move into alinement with its line of movement upon said floor. Its position is indicated by the indicating finger 33 on the graduated segment 34, for a purpose hereinafter again referred to.

The wheel W, which is to be checked as to its camber and caster, is lifted slightly and positioned on a floor truck, designated as a whole by the letter T, whereby said wheel can be moved bodily therewith upon the floor.

Referring now to Figs. 6 to 9 inclusive, we will describe the improved floor truck T, designed to receive a wheel thereupon, with its weight, and to be moved upon the floor.

Said floor truck includes a body plate or member 39, having formed therein three caster wheel holes 40, 40, 40, and in its middle portion a wheel receiving saddle, composed of two opposed wedge-like members 41, 41, bolted to said body member 39, and two opposite upstanding side members 42, 42, also bolted to said body member 39.

Three carrier wheels, as 43, are mounted in the three wheel holes, 40, each wheel having an axle 44, with its opposite ends having bearings in bearing plates 45, 45, bolted to a bearing plate or disc 46, supported on the underside of the body member 39, by brackets, as 47, 47, with balls 48, therebetween, as indicated in Figs. 8 and 9, whereby said wheels can turn with said bearing plates 46, 46, as casters turn, thus making it possible to move said floor truck in all directions as when the usual casters are used.

It will be noted that the body of the floor truck is suspended below the axles of the wheels 43, 43, and are referred to as underslung. This makes it possible to lift the automobile wheel being checked but a short distance from the floor and to move it bodily with said floor truck, while the other front wheel of the automobile moves upon the floor. The caster wheels 43, 43, it will also be noted, extend through openings 46' in the round revoluble bearing plates 46.

The use and operation of the invention may be briefly described as follows:

First. In order to ascertain the camber of a wheel, we will assume that both front wheels of an automobile are resting upon a level floor in straight ahead position. The instrument is placed against the outside of the wheel to be checked and secured thereto in the manner indicated in Figs. 1 and 2 of the drawings, without the floor truck T. The spirit level 26 will enable the operator to properly position the apparatus vertically. The thumb screw 22 is next turned one way or the other, as may be required to adjust the spirit level 20 to center the bubble thereof. This adjustment of the thumb screw 22 also moves the indicator hand 24 over the scale 25, indicating in degrees, for example, the wheel inclination from the vertical, or, the camber.

Second. The caster is the term applied to the amount the king pin is inclined backwardly at the top for the purpose of stabilizing the steering process, and it is determined by comparing its relative effect upon the camber of the wheel as it is turned to the right or left from straight ahead position.

Third. The turning radius is the angle created by each front wheel in turning away from a straight forward position. Two or three readings of each wheel are made, one with the wheels set straight ahead and the others with the wheels set to the extreme right or left. The straight ahead reading is what is commonly known as the toe-in reading and the curved course reading is what is known as the turning radius.

In using the invention to determine the toe-in position of the wheel, the wheel is first mounted in the floor truck T, as shown in Figs. 1 and 2, with the instrument secured against the side of the wheel as before described, and with the trailer caster wheel 38 bearing on the floor. The car is now pulled forward a foot or two in order to enable the trailer caster wheel mechanism to assume its natural course. Through its connections—gears 29 and 30—with the indicator hand or pointer 33, over the graduated segment 34, a straight ahead movement of the caster mechanism is indicated. If the reading is zero, it indicates that the courses are parallel and that the wheel is properly positioned. If other than zero is indicated, then it will be known that the wheel is at variance. If this test is taken with the wheel in the different positions mentioned, its true condition is indicated on the graduated segment 34, as before described. It will be evident that this caster wheel mechanism can be attached in other ways to the axle or other proper part of the car and moved with the car a short distance and the indication compared with the movement of the wheel upon the floor.

We do not, however, limit our invention to the details of construction and arrangement here shown and described, realizing that changes therein can be made without departing from the spirit of the invention, except as we may be limited by the hereto appended claims.

We claim:

1. A wheel alinement apparatus including a floor truck adapted to support and carry a wheel to be checked, a body adapted to be held against the side of said wheel while upon said floor truck, a caster mechanism attached to said body and positioned to move upon the floor along side of said wheel and floor truck, and to turn freely, whereby to assume a natural straight position in alinement with the direction of movement, a graduated scale, an indicator finger associated with said scale and connected to be moved by said caster mechanism to indicate the caster position of said wheel relative to the line of movement of said caster mechanism.

2. A wheel alinement apparatus including, in combination with a vehicle wheel, a caster wheel mechanism adapted to be attached to move with the wheel being checked; said caster wheel mechanism having a trailer arm with caster wheel at its end to run upon the floor and assume a natural position in alinement with the direction of movement, an indicator device connected with and operated by said trailer arm and caster wheel as said caster wheel moves upon the floor with the wheel being checked.

3. An apparatus for checking automobile wheels including a shaft having a trailer arm at its lower end and a caster wheel at the end of said trailer arm to run upon the floor, an indicator hand connected to be operated by said shaft and caster wheel, and a graduated member positioned to cooperate with said indicator hand to indicate the straight ahead position of said caster wheel and trailer arm.

4. In an apparatus of the character referred to, a floor truck to receive and carry the wheel to be checked, said floor truck having caster wheels, side bearing plates therefor and a body plate member supported by said bearing plates below the axles of said caster wheels, and having provision for receiving the wheel to be checked, a caster wheel mechanism supported to be moved along parallel with said floor truck, said caster wheel mechanism including a trailer arm with caster wheel at its floor end and indicator means operable by said caster wheel mechanism to indicate the straight ahead movement thereof.

5. In a wheel checking apparatus a caster wheel designed to be connected with a wheel to run on the floor and assume a straight ahead position when said wheel is moved forward a short distance, indicating means connected with and operated by said caster wheel in its bodily adjustment to the straight ahead position, and indicating mechanism operable by said caster wheel for indicating the relative positions of said caster wheel and said wheel.

6. In a mechanism of the character referred to, a wheel testing device adapted to be connected concentrically at the side of a wheel to be tested, means for indicating the position of said wheel relative to the vertical, a trailer wheel mechanism connected with and forming a part of said device and adapted to assume a straight ahead position when moved forwardly with said wheel, and indicating mechanism operable by said trailer wheel mechanism, to indicate deviation from a straight ahead position of said wheel being tested.

7. In an apparatus for checking vehicle wheels, a member to be secured to the side of a wheel in a plane parallel with the plane of the wheel, a support on the side of said member, a vertical shaft in said support, to turn therein, a trailer arm pivotally connected at one end to the lower end of said shaft and at its free end having a floor engaging element to move upon the floor when said wheel and member are moved forwardly, and an indicating member connected to be operated relative to graduations on a fixed part of said mechanism as said trailer arm mechanism moves relative to the member secured to the side of said wheel.

8. In an apparatus for checking vehicle wheels, a member to be attached to the side of a wheel, a support projecting outwardly therefrom, a vertical shaft rotatably mounted in said support with its lower end downwardly, a trailer arm pivotally connected at one end to the lower end of said vertical shaft with its free end provided with a floor-engaging element to move freely on the floor as said wheel and member attached thereto are moved forwardly, an indicator finger operatively connected with said trailer arm mechanism and graduations associated therewith, whereby the movement of said trailer arm operates said indicator finger relative to said graduations.

9. In mechanism for determining the position of a vehicle wheel relative to its chassis, a body with means for connecting it concentrically at the side of a wheel to be tested, said body having thereon a level and a graduated member with indicating means associated therewith, a trailer wheel connected for operating said indicating mechanism and adapted to assume a straight ahead position when moved forwardly on the floor with the wheel to be tested.

10. In mechanism for determining any deviation of a vehicle wheel from its true normal position relative to its chassis, a body, means for supporting it at the side of a wheel to be tested, said body having thereon a spirit level, and a graduated member with means associated therewith for indicating deviation from normal positions, and a caster wheel mounted to run on the floor with the wheel to be tested and adapted to assume a true normal position when moved with the wheel being tested, said caster wheel having operating connections for actuating said indicating mechanism.

11. In a mechanism for determining the deviation of a vehicle wheel from its true normal position relative to its chassis, a body, means for connecting it concentrically at the side of a wheel to be tested, a spirit level on said body mounted to be adjusted, means for adjusting it, scale means associated therewith to indicate the amount of adjustment of said spirit level, scale means for indicating deviation from straight ahead alinement, a caster wheel mounted to run freely on the floor and to assume a true normal position of movement with the wheel being tested, and operating connections therefrom to said scale means for indicating deviation from the true normal position.

12. In mechanism for determining the variation of a vehicle wheel from its true normal position relative to its chassis, in combination with the indicating mechanism thereof, of means for operating said mechanism and including a caster wheel mounted at the end of a pivoted arm to run freely on the floor and to assume a true forward movement position when moved with the wheel being tested, and operating connections from said arm to said indicating mechanism for actuating the same.

13. In a mechanism for testing a vehicle wheel, a body to be supported concentrically at the outer side of a wheel, an indicating mechanism thereon operable to indicate deviation from normal position, a caster wheel mounted to run freely on the floor and to assume a true forward movement position when moved with the wheel to be tested, and operating connections from said caster wheel to said indicating mechanism for actuating the same.

ROBERT M. GREENLEAF.
PAUL C. PALMER.